(12) United States Patent
Ashwood-Smith

(10) Patent No.: US 8,767,730 B2
(45) Date of Patent: Jul. 1, 2014

(54) VIRTUAL LOCAL AREA NETWORK IDENTIFIER SUBSTITUTION AS TIME TO LIVE METHOD

(75) Inventor: Peter Ashwood-Smith, Gatineau (CA)

(73) Assignee: Futurewei Technologies, Inc., Plano, TX (US)

( * ) Notice: Subject to any disclaimer, the term of this patent is extended or adjusted under 35 U.S.C. 154(b) by 184 days.

(21) Appl. No.: 13/370,755

(22) Filed: Feb. 10, 2012

(65) Prior Publication Data

US 2013/0208718 A1   Aug. 15, 2013

(51) Int. Cl.
H04L 12/28 (2006.01)

(52) U.S. Cl.
USPC .......................................... 370/389; 370/392

(58) Field of Classification Search
USPC .............. 370/389, 229, 230, 230.1, 231, 392, 370/400, 401, 402, 403, 404, 408
See application file for complete search history.

(56) References Cited

U.S. PATENT DOCUMENTS

| 6,952,421 | B1 | 10/2005 | Slater | |
|---|---|---|---|---|
| 2001/0030969 | A1* | 10/2001 | Donaghey et al. | 370/397 |
| 2008/0137556 | A1* | 6/2008 | Park et al. | 370/255 |
| 2008/0239992 | A1* | 10/2008 | Krasnyanskiy | 370/256 |
| 2009/0041012 | A1* | 2/2009 | Taylor et al. | 370/389 |

FOREIGN PATENT DOCUMENTS

WO   2011116460 A1   9/2011

OTHER PUBLICATIONS

Pearlman, R., et al., "RBridges: Base Protocol Specification," draft-ietf-trill-rbridge-protocol-16.txt, Mar. 3, 2010, 118 pages.
Foreign Communication From a Counterpart Application, PCT Application PCT/US2013/025098, International Search Report dated Apr. 24, 2013, 5 pages.
Foreign Communication From a Counterpart Application, PCT Application PCT/US2013/025098, Written Opinion dated Apr. 24, 2013, 12 pages.
"Virtual Bridged Local Area Networks—Amendment: Equal Cost Multiple Paths (ECMP)," Draft Standard for Local and Metropolitan Area Networks; IEEE P802.1Qbp/D0.1, Oct. 13, 2011, 58 pages.
Bryant, et al., "TRILL Using Pseudo-Wire Emulation (PWE) Encapsulation," draft-bryant-perlman-trill-pwe-encap-00.txt, 13 pages.

* cited by examiner

*Primary Examiner* — Gary Mui
(74) *Attorney, Agent, or Firm* — Conley Rose, P.C.; Grant Rodolph; Rayhao A. Chung

(57) ABSTRACT

An apparatus comprising a node that uses a set of determined virtual local area network (VLAN) identifier (VIDs) to provide a hop limit for a packet forwarded by the node in a network. Also disclosed is a network component comprising a receiver that receives a packet comprising a VID that belongs to a determined set of ordered VIDs, a processor that substitutes the VID in the packet from the set of ordered VIDs and maps the VID to a next hop or instead drops the VID if the VID is a last ordered VID of the ordered VIDs, and a transmitter that forwards the packet comprising the substituted VID to the mapped next hop.

20 Claims, 6 Drawing Sheets

VIRTUAL LOCAL AREA NETWORK IDENTIFIER SUBSTITUTION AS TIME TO LIVE METHOD

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communications and data networks are comprised of nodes that transport data through the network. The nodes may include routers, switches, bridges, or combinations thereof that transport the individual data packets or frames through the network. Some networks may offer data services that forward data frames or packets from one node to another node across the network without using pre-configured routes on intermediate nodes. Other networks may forward the data frames or packets from one node to another node across the network along pre-configured or pre-established paths. The packets forwarded in the network may be unicast packets that are transmitted to a plurality of nodes via a plurality of corresponding point-to-point (P2P) links. Alternatively, the packets forwarded in the network may be multicast packets that are transmitted to a plurality of nodes via a point-to-multipoint (P2MP) link or a tree.

SUMMARY

In one embodiment, the disclosure includes an apparatus comprising one or more nodes that uses a set of determined virtual local area network (VLAN) identifier (VIDs) to provide a hop limit for a packet forwarded by the node in a network.

In another embodiment, the disclosure includes a network component comprising a receiver that receives a packet comprising a VID that belongs to a determined set of ordered VIDs, a component or sub-component that substitutes the VID in the packet from the set of ordered VIDs and maps the packet comprising the VID to a next hop or instead drops the VID if the VID is a last ordered VID of the ordered VIDs, and a transmitter that forwards the packet comprising the substituted VID to the mapped next hop.

In a yet another embodiment, the disclosure includes a computer program product in a computer readable media comprising first instructions executable by a processor for receiving using a receiver a packet comprising a VID, second instructions executable by a processor for matching the VID in the received packet to a forwarding instance identifier (FID) that determines, with other elements of the packet, a next hop for forwarding the packet, third instructions executable by a processor for substituting the VID with a next ordered VID in the determined set of ordered VIDs, fourth instructions executable by a processor for forwarding the packet comprising the next ordered VID to the next hop, and fifth instructions executable by a processor for dropping the packet if the VID corresponds to a last ordered VID in a determined set of ordered VIDs.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
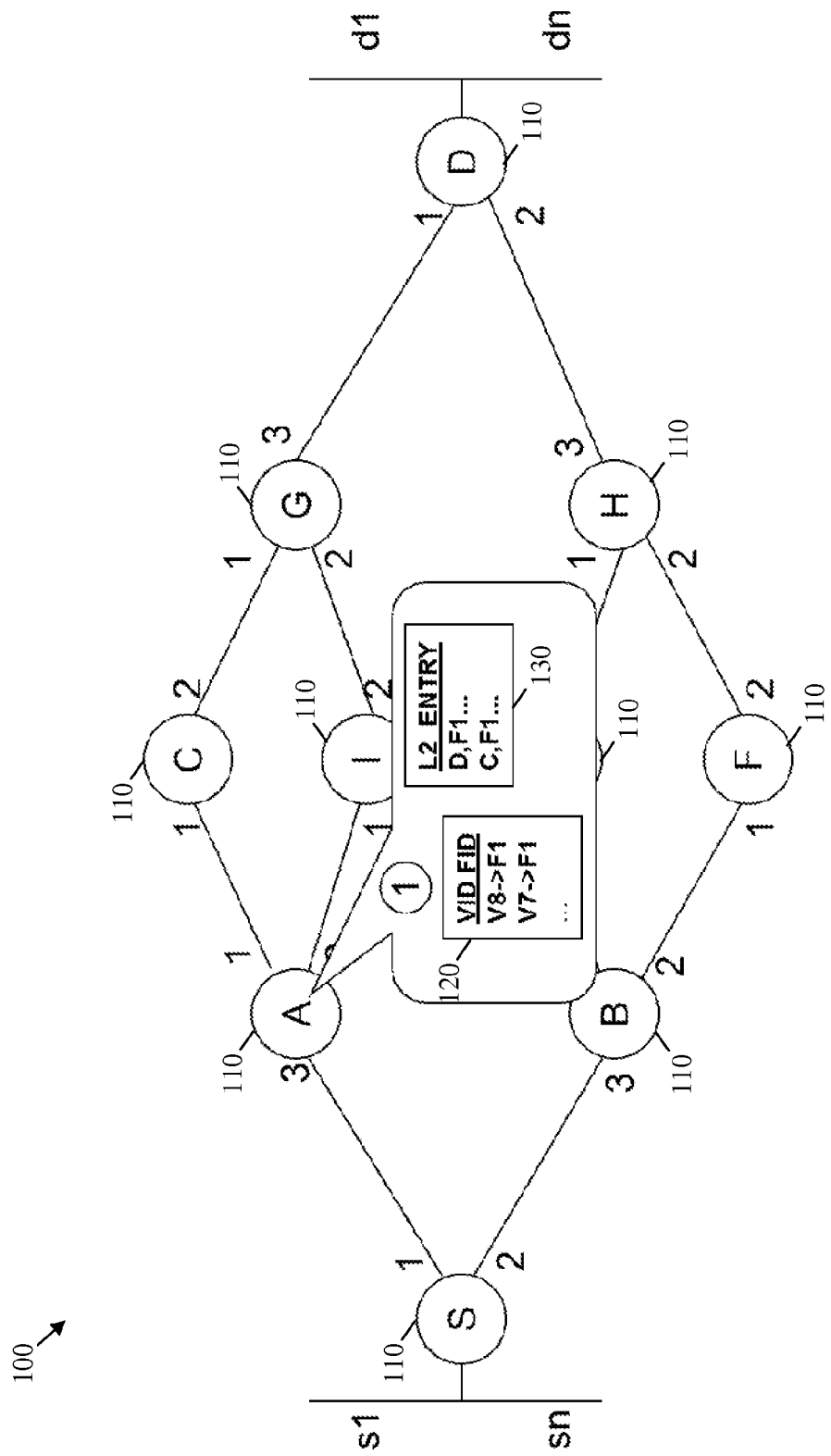
FIG. 1 is a schematic diagram of an embodiment of a VID mapping scenario.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Some packet forwarding schemes, e.g., unicast and multicast schemes, may cause forwarding loops, which may reduce networking efficiencies and waste resources. Previous and current methods to prevent forwarding loops include Spanning Tree Protocols (STPs) that use relatively complex control plane logic to avoid creating data paths that loop, and the Institute of Electrical and Electronics Engineers (IEEE) 802.1aq standard and the Internet Engineering Task Force (IETF) Transparent Interconnect of Lots of Links (TRILL) protocols, which use reverse path forwarding to suppress multicast loops. The methods also include Internet Protocol (IP) and TRILL/Multiprotocol Label Switching (MPLS), which use a bit field time to live (TTL) that is hop-wise decremented (by one) and stops looping packets when it reaches zero. Another current method is the IEEE 802.1Qbp standard protocol that introduces a new tag with a TTL for loop prevention to Media Access Control (MAC)-in-MAC frames. Such schemes may be relatively complex, require adding new fields, and/or require new hardware.

Disclosed herein is a system and method for preventing packet forwarding loops using VID substitution as a means of implementing a TTL mechanisms in a packet based network. The VID substitution scheme may be used in networks, where VID encapsulation may be implemented as part of a tunneling mechanism. The VID may be substituted or swapped at each next hop in the network and hence the packet may be dropped after a selected number of hops to prevent an infinite unicast or multicast loop. Using VID substitution may not require adding a new field to the packet and may be implemented using relatively simple control plane logic and current or available network equipment/hardware.

The system and method may use a set of VIDs (VID values) that may be ordered in a determined sequence, e.g., from largest to smallest value. The order or sequence of VIDs may be known to the network or the forwarding nodes (hops) in the network. When a packet is initially encapsulated, the first VID in the set (e.g., the largest VID) may be used. When the packet is forwarded by forwarding nodes, the VID may be swapped at each hop with the next VID in the order (e.g., the next smaller value). When the VID reaches the last ordered value in the set (e.g., the smallest value) at a hop before reaching the packet's destination, then the packet may be dropped. The forwarding logic may treat all the VIDs (except the last ordered VID) in the ordered set similarly by mapping the VIDs to the same FID at each hop. The FID may be used in combination with other fields in the packet to determine on which port or link to forward the packet (after properly swapping the VID).

FIG. 1 illustrates an embodiment of a VID mapping scenario 100, which may be used for the VID substitution scheme (as a TTL mechanism) to prevent loops. The scheme may be implemented in a network that comprises a plurality of nodes 110. The nodes 110 may be any nodes, devices, or components configured to receive, transmit, and/or forward packets associated with the network. The nodes 110 may be coupled to each other via a plurality of links, which may include wired (fixed) and/or wireless links. The packets may be Ethernet packets, e.g., forwarded at the data link layer or layer 2 (L2) of the Open Systems Interconnection (OSI) model, and/or any other type of packets, e.g., MAC frames, IP packets, etc. The network may be an Ethernet network or any other network that transfer data in the form of packets, frames, or other encapsulated or tunneled data. The network may also be any network that does not support using a TTL field for preventing loops, such as some optical based networks. The nodes 110 may be located in a backbone of the network. The backbone portion may extend from an ingress or source node 110 (node S) to an egress or destination node 110 (node D). The source node 110 may be coupled to a plurality of sources (labeled s1 to sn), which may be nodes or other components that transmit packets, e.g., into the network or the backbone portion of the network. The destination node 110 may be coupled to a plurality of destinations (labeled d1 to dn), which may be nodes or other components that receive the packets, e.g., from the network or the backbone portion of the network.

In the VID mapping scenario 100, a set of VIDs, such as Backbone VIDs (B-VIDs), may be reserved in the network, e.g., where the size of the set may greater than an expected diameter of the network. The size of the set may be determined by the number of the reserved VIDs in the set. The number of the reserved VIDs may determine the maximum number of hops (nodes) permitted to forward the same packet. The packet may be dropped when the maximum number of hops is reached before delivering the packet to its destination. The VIDs (or B-VIDs) in the set may be ordered according to a determined sequence and may be swapped at each next hop according to that sequence until reaching the maximum number of hops with the last ordered VID in the sequence. For instance, the VIDs may be ordered from a largest value to a smallest value. The largest value may be initially used in the forwarded packet and then swapped by the next smaller value in the set at each next hop (node 110) until the smallest value is reached. If the smallest value is reached before delivering the packet to its destination, then the packet may be discarded and dropped. In another implementation, the VIDs may be ordered from a smallest value to a largest value, where the current value in the packet may be swapped with next larger value in the set at each next hop until the largest value is reached. In other embodiments, any other selected sequence of values may be used, e.g., according to an order or sequence list that may be used for reference.

To support the VID substitution scheme, the nodes 110 may use a plurality of tables (or other data structures) for processing the VIDs properly, including a VID-to-FID mapping table 120 and a L2 forwarding table 130, e.g., a forwarding information base (FIB). Each node 110 may comprise a corresponding group of such tables. The VID-to-FID mapping table 120 may map all the reserved VIDs (of the determined ordered set) to the same FID, which may be used (instead of the VIDs), with other fields in the packet, to determine the next hop for the packet. The L2 forwarding table 130 may be used to map the FID (associated with all the reserved VIDs) with other fields in the packet to the next hop, and hence the corresponding port/link.

The VID mapping scenario 100 shows a node 110 (node A) comprising the VID-to-FID table 120 and the L2 forwarding table 130. The VID-to-FID table 120 may map the reserved VIDs (e.g., that have values V0 to V8) to the same FID (e.g., that has a value F1). The L2 forwarding table 130 may map that same FID value (e.g., F1), with other fields in the packet, to two ports associated with two corresponding nodes 110 (nodes D and C). Node C may be a next hop of node A, and node D may be an egress node of the backbone portion of the network. The egress node may be the destination of the packet or may be coupled to the destination of the packet, e.g., one of the destinations d1 to dn. Specifically, the node 110 (e.g., node A) may receive a packet and detect the VID in the packet. The node 110 may then map that VID to the FID using the VID-to-FID mapping table 120. The node 110 may then use the L2 forwarding table 130, with other fields in the packet, to determine the next hop (e.g., node C) that is associated with that FID, and hence properly forward the packet (e.g., at the L2 level) to the next hop.

Figure 2:
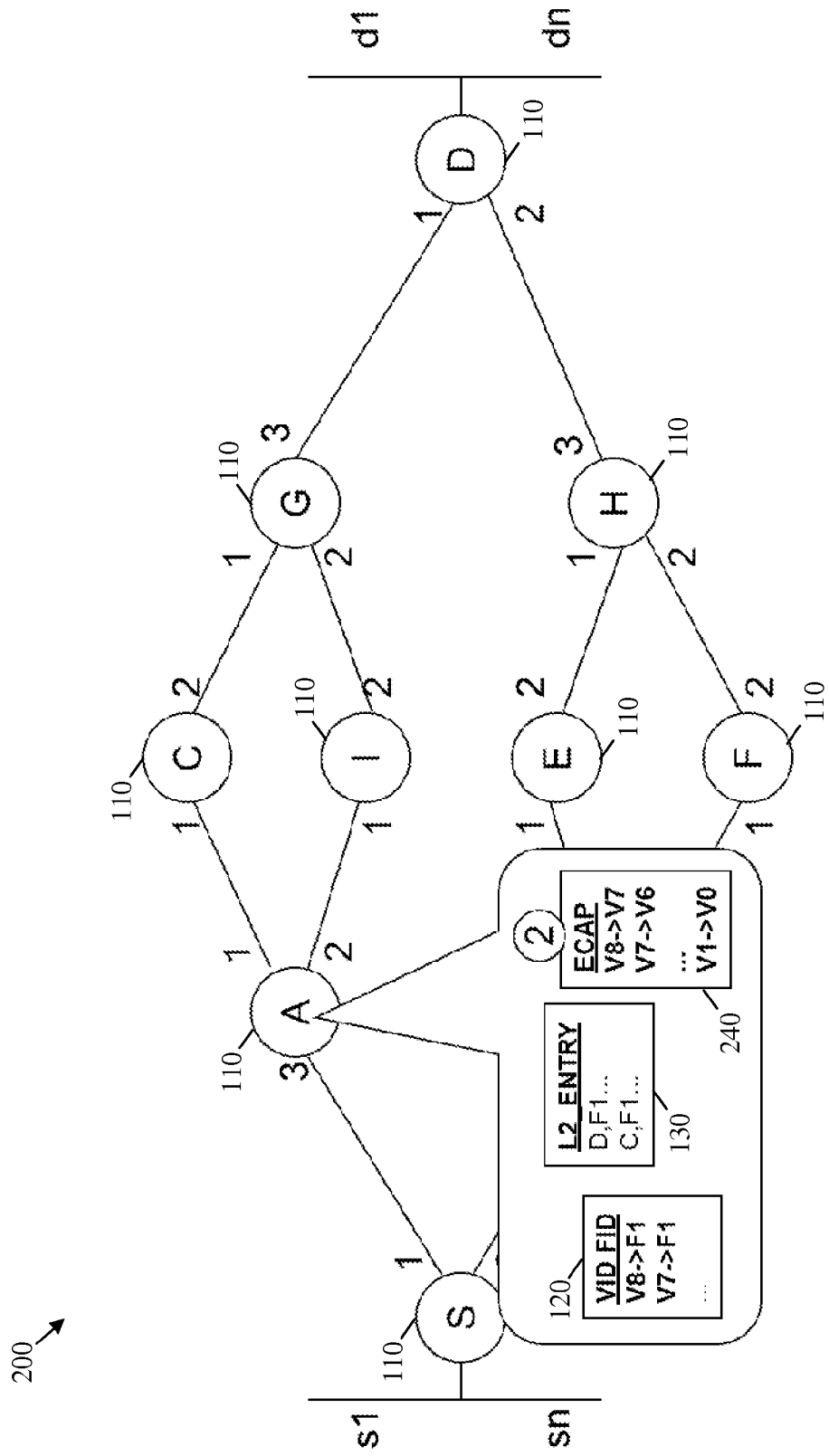
FIG. 2 is a schematic diagram of an embodiment of a VID substitution scenario.

FIG. 2 illustrates an embodiment of a VID substitution scenario 200, which may be used with the VID mapping scenario 100 to prevent loops in the network. In the VID substitution scenario 200, the nodes 110 may use an egress logic component or process to swap the VID in the packet according to the pre-determined order of the set of VIDs, before forwarding the packet. For instance, the node 110 may comprise an egress mapping table 240 that may be used to map each VID value in the set to a next ordered VID value in the sequence. The VID substitution scenario 200 shows the node A comprising the egress mapping table 240 (with the VID-to-FID table 120 and the L2 forwarding table 130). The egress mapping table 240 may indicate the substitution mapping between the reserved VIDs. For example, the largest value V8 is mapped to the next largest value V7, and similarly V7 is mapped to V6 . . . and V1 to V0. Since V0 may be the smallest value, V0 may not be mapped in the egress mapping table 240 and instead the packet comprising V0 may be dropped. This VID (or B-VID) mapping may be represented as VIDn→VIDn−1 (or B-VIDn 4→B-VIDn−1).

Figure 3:
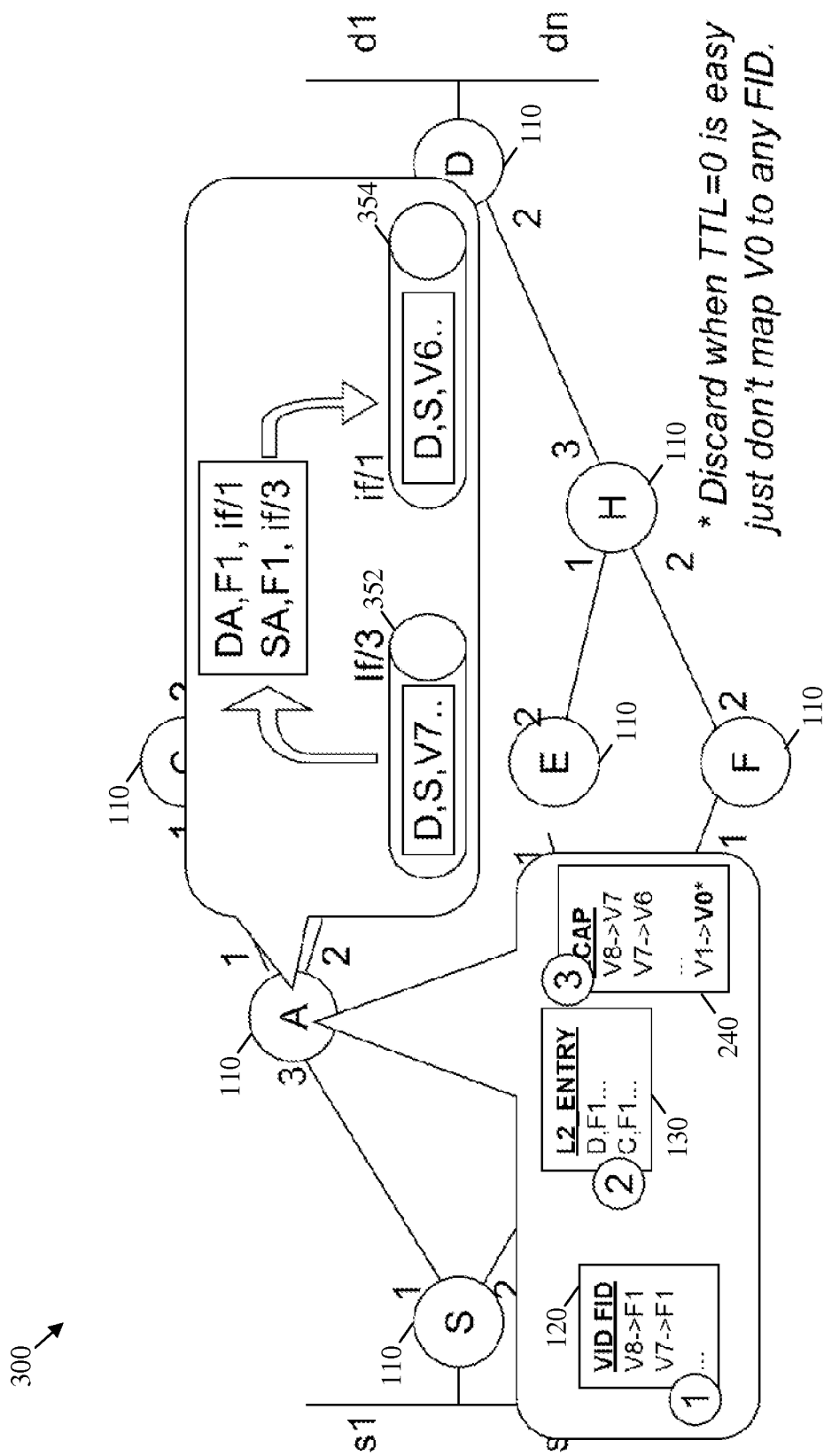
FIG. 3 is a schematic diagram of an embodiment of a VID forwarding scenario.

FIG. 3 illustrates an embodiment of a VID forwarding scenario 300, which may be used with the VID mapping scenario 100 and the VID substitution scenario 200 to prevent (unicast and multicast) loops in the network. In the VID forwarding scenario 300, the nodes 110 may use the VID-to-FID table 120, the L2 forwarding table 130, and the egress logic (the egress mapping table 240) to determine the next hop for forwarding the packet, substitute or drop the VID in the packet, and forward the substituted packet accordingly.

The VID forwarding scenario 300 shows the processing and handling of the packet and VIDs at the node A. Specifically, the node A may receive on a first port or interface (e.g., interface 3 (if/3)) an incoming packet 352, which may comprise a destination address (D), a source address (S), and one of the VIDs (e.g., V7). The node A may then find a match for the VID in the VID-to-FID table 120 to obtain a FID for forwarding the packet. The node A may then use the obtained FID to find a match in the L2 forwarding table 130, with the packet's destination address (D), that indicates a next hop (e.g., node C) for forwarding the packet.

Before attempting to forward the packet, the node A may check if the VID corresponds to the last ordered VID (V0) in the set of VIDs. If this is true, then the node A may drop the packet and may not forward the packet. However, in the scenario 300, the received VID corresponds to V7 and not V0. Thus, the node A may instead use the received VID (V7) to find a match (e.g., V6) in the egress mapping table 240 for substituting the VID. The node A may then forward an outgoing packet 354 corresponding to the incoming packet 252 and comprising the matched VID (V6) to the next hop (node C), as indicated in the L2 forwarding table 130. The packet may be forwarded at L2. The node A may check if the VID is the last ordered VID before or after mapping the FID in the L2 forwarding table 130 and before or after attempting to substitute the VID using the egress mapping table 240.

Figure 4:
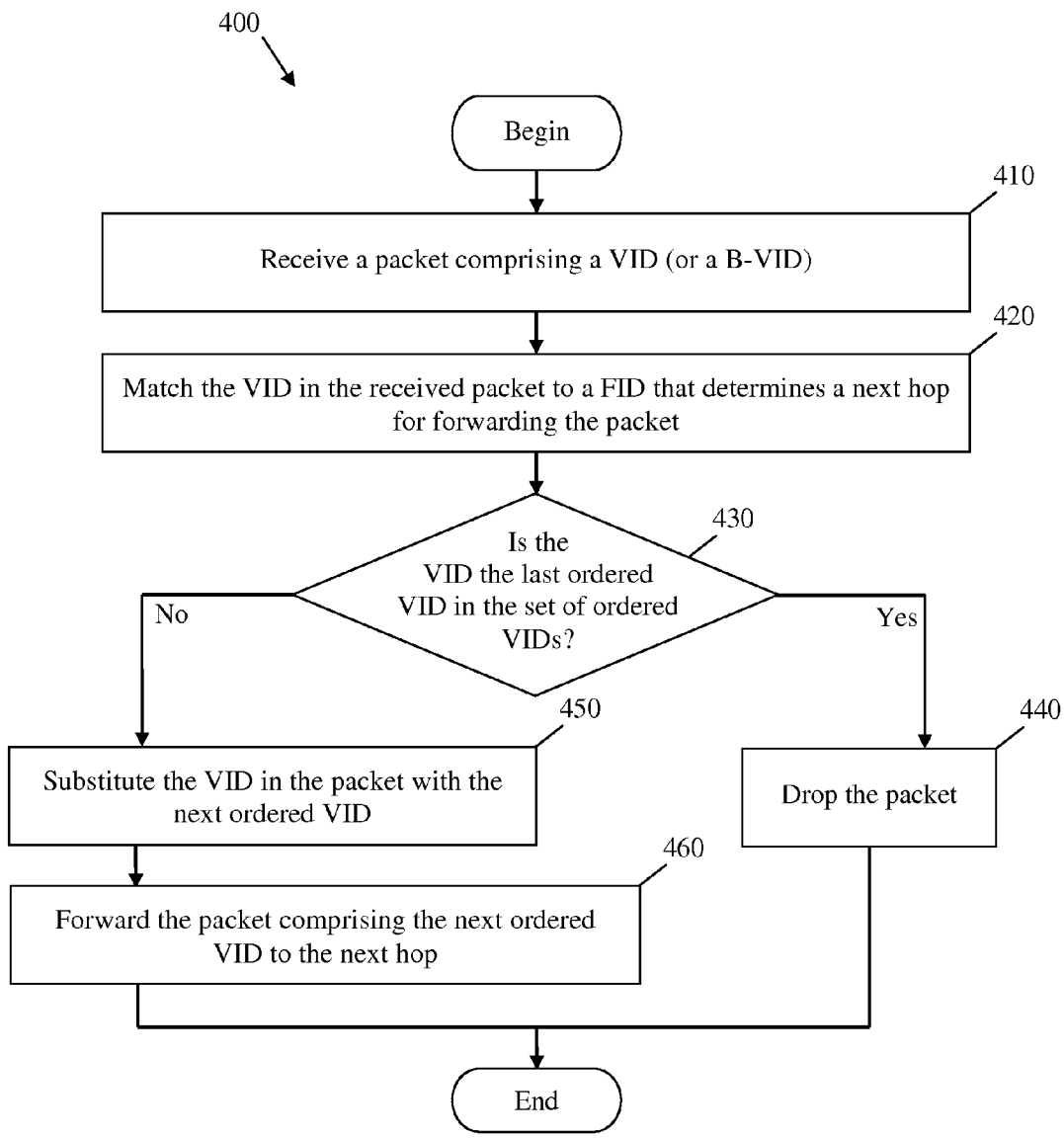
FIG. 4 is a flowchart of an embodiment of a loop control forwarding method.

FIG. 4 illustrates an embodiment of a loop control forwarding method 400 that may be implemented in the packet forwarding scenarios above, e.g., by any of the nodes 110. The node 110 may implement the method 400 using hardware, software, or both. The loop control forwarding method 400 may begin at block 410, where a packet comprising a VID (or a B-VID) may be received. The VID (e.g., a B-VID) in the packet may be one of a plurality of reserved VIDs in a set of ordered VIDs, e.g., from the largest to the lowest value. At block 420, the VID in the received packet may be matched to a FID that, with other fields in the packet, determines a next hop for forwarding the packet. For instance, the VID may be matched to the FID using the VID-to-FID mapping table 120 or a comparable data structure. The next hop may then be determined using the FID, the packets destination field, and the table L2 forwarding table 130 or a comparable data structure, as described above.

At block 430, the method 400 may determine whether the VID is the last ordered VID in the set of ordered VIDs. If the condition of block 440 is true, then the method may proceed to block 440. Otherwise, the method 400 may proceed to block 450. At block 440, the packet may be dropped. The method 400 may then end. At block 450, the VID in the packet may be substituted with the next ordered VID. The VID may be substituted by mapping the VID to a next ordered VID using a mapping table or list. Alternatively, the VID value may be changed according to a mapping logic or equation, such as by decreasing (or increasing) the VID value by some determine amount, such as one (as described in the scenario 300). At block 460, the packet comprising the next ordered VID may be forwarded to the next hop. The method 400 may then end. In another embodiment, the block 430 may be implemented before the block 420, where the method may determine whether the received VID is the last ordered VID in the set before matching the VID in the received packet to a FID. The method 400 may limit the number of hops that forward a packet and thus prevent loops, for instance in a network that uses tunnel encapsulation and forwarding of unicast and/or multicast packets. Further, the number of hops may be limited without using reserved TTL bits and without adding a TTL logic to hardware, such as a Broadcom (BCM) chip.

Figure 5:
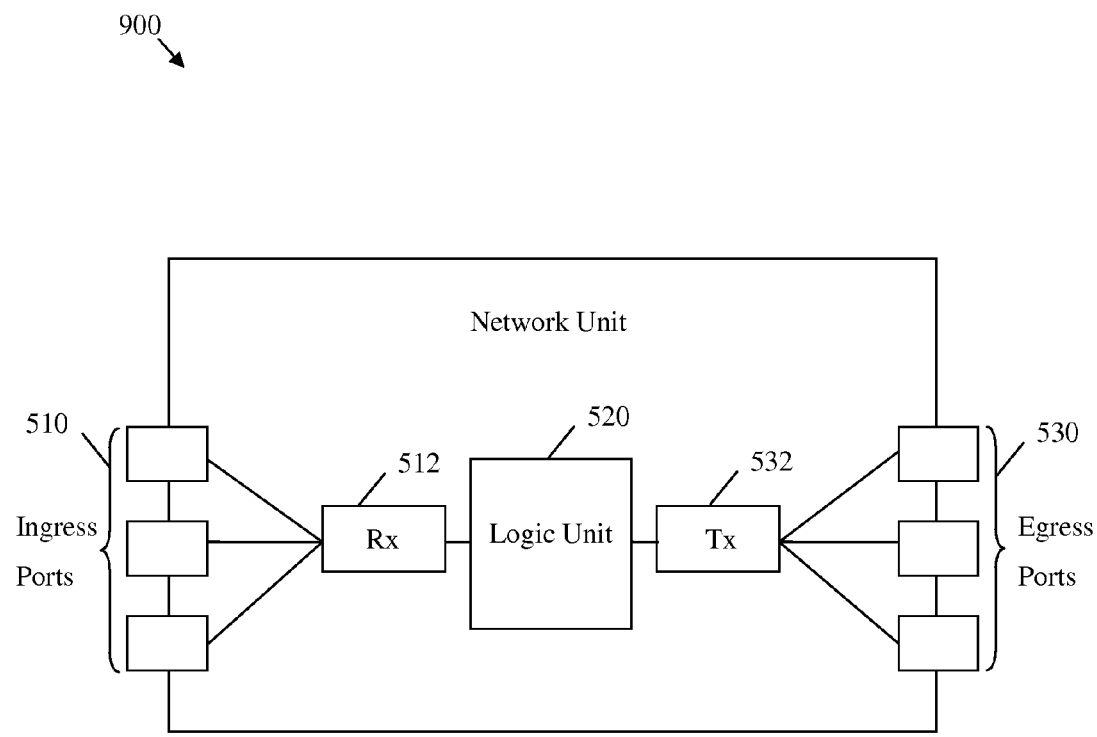
FIG. 5 is a schematic diagram of an embodiment of a network unit.

FIG. 5 illustrates an embodiment of a network unit 500, which may be any device that transports packets through a network. For instance, the network unit 500 may correspond to any of the nodes 110 in the scenarios above. The network unit 500 may comprise one or more ingress ports 510 coupled to a receiver 512 (Rx), which may be configured for receiving packets or frames, objects, options, and/or Type Length Values (TLVs) from other network components. The network unit 500 may comprise a logic unit or processor 520 coupled to the receiver 512 and configured to process the packets or otherwise determine to which network components to send the packets. The logic unit or processor 520 may be implemented using hardware, software, or both. The network unit 500 may also comprise one or more egress ports 530 coupled to a transmitter 532 (Tx), which may be configured for transmitting packets or frames, objects, options, and/or TLVs to other network components. The logic unit or processor 520, the receiver 512, and the transmitter 532 may also be configured to implement or support any of the schemes and methods described above (the method 400).

Figure 6:
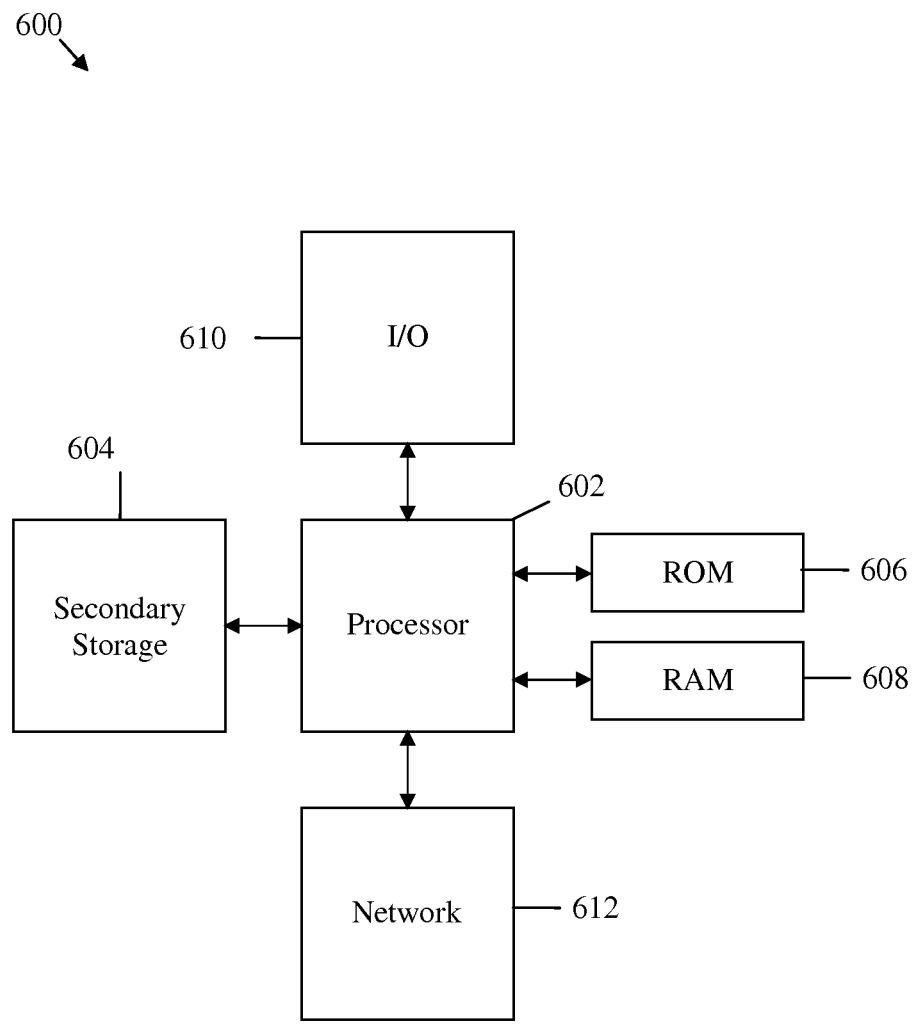
FIG. 6 is a schematic diagram of an embodiment of a general-purpose computer system.

The network components and/or methods described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs) and/or digital signal processors (DSPs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to second storage 604.

The second storage 604 is typically comprised of one or more disk drives or tape drives and is used for non-volatile storage of data and as an over-flow data storage device if RAM 608 is not large enough to hold all working data. Second storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of second storage 604. The RAM 608 is used to store volatile data and perhaps to store instructions. Access to both ROM 606 and RAM 608 is typically faster than to second storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims.

Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
    a node that uses a set of virtual local area network (VLAN) identifiers (VIDs) to provide a hop limit for a packet forwarded by the node in a network,
    wherein a size of the set of VIDs is greater than an expected diameter of the network and corresponds to the number of VIDs used in the set, and
    wherein the number of VIDs determines a maximum number of hops permitted to forward the packet.

2. The apparatus of claim 1, wherein at least one of the VIDs is swapped in the packet in a determined order at each one of a plurality of nodes at each corresponding hop, and wherein the packet is dropped when the maximum number of hops is reached before reaching the packet's destination.

3. The apparatus of claim 2, wherein the determined order is from a largest VID of the VIDs to a smallest VID of the VIDs.

4. The apparatus of claim 1, wherein the packet comprises one of the VIDs, a source address, and a destination address, wherein all the VIDs are mapped to a forwarding instance identifier (FID), and wherein the FID is mapped to a forwarding table that determines a next hop for forwarding the packet.

5. A network component comprising:
    a receiver configured to receive a packet comprising a first virtual local area network (VLAN) identifier (VID) that belongs to a set of VIDs;
    a processor configured to:
        substitute the first VID in the packet with a second VID from the set of VIDs;
        map the VID to a forwarding instance identifier (FID); and
        determine a next hop for the packet using the FID; and
    a transmitter configured to forward the packet comprising the second VID to the next hop,
    wherein the set of VIDs comprises a plurality of reserved VIDs that are arranged in a pre-determined order, and
    wherein the second VID comes after the first VID within the pre-determined order.

6. The network component of claim 5, wherein the VID is mapped to the FID according to a VID-to-FID mapping table, wherein the VID-to-FID mapping table maps each of the reserved VIDs to the same FID, and wherein the FID matches an entry within a forwarding table that indicates the next hop for the packet.

7. The network component of claim 5, further comprising a memory coupled to the processor, wherein the memory is configured to store a list that maps each of the reserved VIDs to a corresponding next ordered reserved VID, and wherein one of the reserved VIDs that is indicated as a last reserved VID according to the pre-determined order for the set of VIDs is not mapped to another reserved VID.

8. The network component of claim 5, wherein the receiver is configured to receive a second packet comprising a third VID that belongs to the set of VIDs, wherein the third VID matches the last reserved VID within the set of VIDs, and wherein the processor is configured to discard the second packet.

9. The network component of claim 5, wherein the predetermined order arranges the reserved VIDs within the set of VIDs from largest to smallest values.

10. The network component of claim 9, wherein the second VID has the next smallest value in reference to the first VID based on the pre-determined order, and wherein a number of reserved VIDS within the set of VIDs is greater than an expected diameter of a network.

11. A computer program product comprising computer executable instructions stored on a non-transitory computer readable medium that when executed by a processor causes a node to perform the following:
receive a packet comprising a virtual local area network (VLAN) identifier (VID);
match the VID in the received packet to a forwarding instance identifier (FID) that determines a next hop for forwarding the packet;
substitute the VID with a next ordered VID in the determined set of ordered VIDs;
forward the packet comprising the next ordered VID to the next hop; and
drop the packet if the VID corresponds to a last ordered VID in a determined set of ordered VIDs.

12. The computer program product of claim 11, wherein the VID in the received packet is substituted with a next ordered VID according to a determined and known sequence of VIDs.

13. The computer program product of claim 12, wherein the packet comprising the next ordered VID is forwarded to the next hop if the next order VID is greater than or equal to the smallest VID in the determined set or is dropped if the VID in the received packet is equal to the smallest VID in the determined set.

14. The computer program product of claim 11, wherein the VID in the received packet is substituted with a next ordered VID by decreasing the VID in the received packet by about one.

15. The computer program product of claim 11, wherein the VID in the received packet is substituted with a next ordered VID by increasing the VID in the received packet by about one.

16. The computer program product of claim 15, wherein the packet comprising the next ordered VID is forwarded to the next hop if the next order VID is less than or equal to the largest VID in the determined set or is dropped if the VID in the received packet is equal to the largest VID in the determined set.

17. A method for loop prevention within a network, the method comprising:
storing an egress mapping table that arranges a plurality of reserved virtual local area network (VLAN) identifiers (VIDs) in a pre-determined order;
receiving a packet that comprises a first VID that corresponds to one of the reserved VIDs;
determining whether the first VID corresponds to a last ordered reserved VID specified by the egress mapping table;
discarding the packet when the first VID corresponds to the last ordered reserved VID;
substituting the first VID with a second VID that corresponds to one of the reserved VIDs within the egress table when the first VID does not correspond to the last ordered reserved VID;
mapping the first VID to a forwarding instance identifier (FID); and
transmitting the packet with the second VID via an output link when the first VID does not correspond to the last ordered reserved VID,
wherein the second VID is the next reserved VID according to the pre-determined order set by the egress mapping table, and
wherein the FID is used to determine the output link.

18. The method of claim 17, further comprising storing a VID-to-FID mapping table used to map the first VID to the FID, and wherein the egress mapping table arranges the reserved VIDs in numerical order.

19. The method of claim 17, wherein the second VID has a smaller value than the first VID, and wherein the last ordered reserved VID is assigned the smallest value within the egress mapping table.

20. The method of claim 17, further comprising storing a forwarding table that maps the FID to the output link, wherein the first VID indicates whether the packet is able to be forwarded to a next hop destination node, and wherein a number of reserved VIDs is greater than an expected diameter of the network.

* * * * *